H. F. SCHMIDT.
LUBRICATING JOURNAL BEARING.
APPLICATION FILED FEB. 20, 1920.
1,416,884.
Patented May 23, 1922.
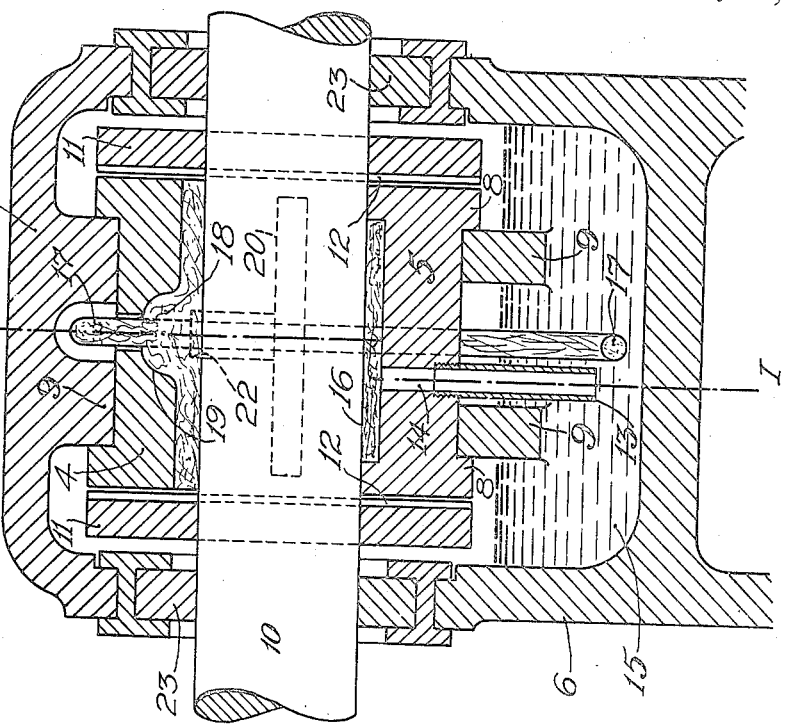
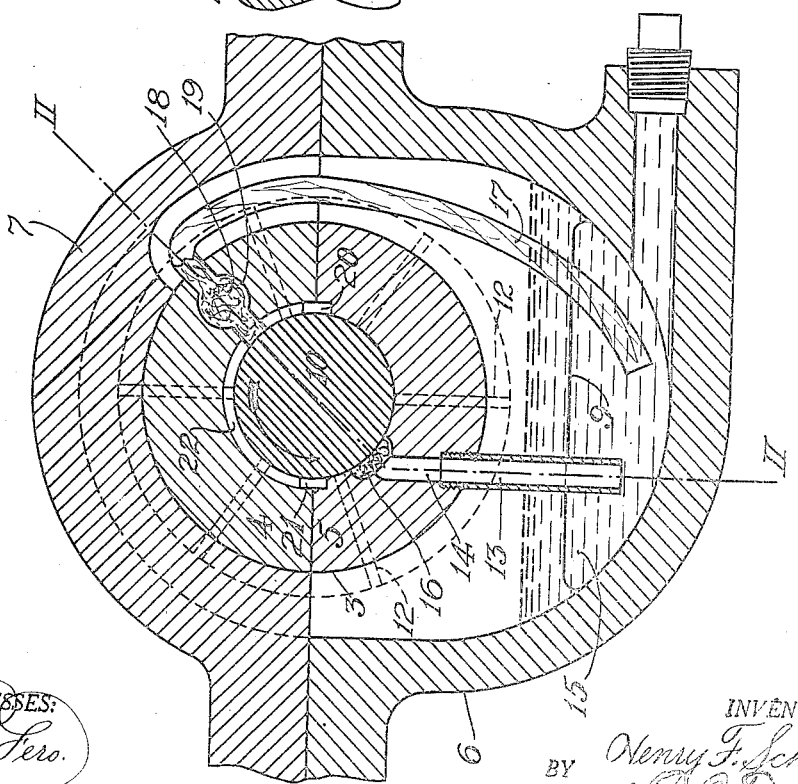
WITNESSES:
INVENTOR.
Henry F. Schmidt
BY
ATTORNEYS.

UNITED STATES PATENT OFFICE.

HENRY F. SCHMIDT, OF SWARTHMORE, PENNSYLVANIA, ASSIGNOR TO WESTINGHOUSE ELECTRIC AND MANUFACTURING COMPANY, A CORPORATION OF PENNSYLVANIA.

LUBRICATING JOURNAL BEARING.

1,416,884.

Specification of Letters Patent. Patented May 23, 1922.

Application filed February 20, 1920. Serial No. 360,189.

*To all whom it may concern:*

Be it known that I, HENRY F. SCHMIDT, a citizen of the United States, and a resident of Swarthmore, in the county of Delaware and State of Pennsylvania, have made a new and useful Invention in a Lubricating Journal Bearing, of which the following is a specification.

My invention relates to bearings and particularly to that type of bearings used for supporting marine propeller shafts, and has for an object to produce a simple, efficient bearing provided with lubricant-circulating apparatus adapted to ensure constant and effective lubrication of the bearing under the severe continuous service required in the operation of marine propellers.

A further object is to supplement the well-known vacuum-operated oiling device with means for air-sealing the space between the journal and the bearing so that a vacuum is constantly contained in the oiling system.

These and other objects are attained by means of the apparatus herein described and illustrated in the drawings accompanying and forming a part hereof, wherein—

Fig. 1 is a transverse vertical section through a bearing taken on the line 1—1 of Fig. 2.

Fig. 2 is a longitudinal oblique section taken on the line II—II of Fig. 1.

Bearings have heretofore been provided with conduits connecting an oil chamber beneath the bearing with the space between the journal and the bearing, whereby oil is circulated through the conduit by reason of the vacuum created adjacent the point of oil supply by the rotation of the journal within the bearing. This principle of oil circulation is well known and the form of pump used in applying the principle will for the purpose of convenience be hereinafter referred to as a vacuum lubricating pump.

The operation of this form of pump depends almost entirely upon the oil film present between the bearing and the journal, this film excluding the air from the oil conduits so that a vacuum may be maintained in the oiling system. This type of pump operates successfully for delivering ample quantites of lubricant to the bearings so long as the vacuum is properly maintained, but should the vacuum be broken for any reason, the supply of oil immediately stops because the pump no longer functions to circulate it, and should the oil in the bearing be insufficient to establish the air seal immediately after the vacuum has been broken, so that the pumping process may continue, the bearing would soon become dangerously dry.

In marine propeller shaft installations where the service is severe and continuous, it is necessary to maintain at all times ample circulation of lubricant over the bearing surfaces. Vacuum lubricating pumps are used in such installations, but it frequently happens that because of slight lateral oscillations of the journal in the bearings, especially if the bearings are slightly worn, the air seal is broken with the result that the oil supply is immediately discontinued. If the oil in the bearing is insufficient at this time to reestablish the air seal between the bearing and the journal, no more oil is circulated and the bearing becomes dry and overheated.

In order to obviate this danger, I provide a bearing wherein means are provided to augment the vacuum pump so that the vacuum is increased and the amount of oil circulated thereby correspondingly increased, thus eliminating the liability of the air seal becoming broken. In addition to this, I provide an auxiliary oil delivering means for supplementing the vacuum pump, so that in the event of a temporary failure of the pump, the auxiliary means will renew the air seal immediately after it has become broken. The auxiliary oiling system also serves to prevent the breaking of the air seal and ensures an ample supply of oil for maintaining the air seal when the journal is idle and the vacuum pump is not functioning.

Referring to the drawings for a more detailed understanding of my invention, I show, a split bearing 3 comprising upper and lower bushing members 4 and 5 respectively. These are mounted in a bearing block 6, which is adapted to be securely anchored to the ship structure in the case of a marine installation wherein the bearing is supporting a propeller shaft. The bearing block is provided with a cap 7 which fits over and retains the bearings against vertical displacement. The bushing members 4 and 5 are each provided with end flanges 8, which engage webs 9 provided in the block and cap and prevent longitudinal displacement of the bearing bushings with respect to the block and cap.

The shaft 10 is provided with a pair of spaced collars 11, which may be integral with the shaft or secured thereto in any preferred manner. The collars are disposed on the shaft so that the bearing bushings fit closely between them. The collars are provided with radial grooves 12 and their purpose will hereinafter appear.

The vacuum lubricating pump previously referred to comprises a conduit 13, which connects with the passage 14 in the collar bearing bushing 5 and extends downwardly into the oil 15, which is retained in a suitable receptacle in the bottom of the bearing block. The passage 14, terminates in a longitudinally extending distributing pocket 16 in which is placed some loose waste or other oil retaining material, but it will be understood that this packing is of such a nature that the oil may circulate freely through it. The rotation of the journal within the bearing creates a partial vacuum in the upper end of the passage 14, in a manner well known in the art. The pressure outside of the bearing being greater than the pressure in the passage 14 causes the oil in the block 6 to be forced up through the pipe 13 into the pocket 16, which, it will be noted, terminates at each end a short distance from the ends of the bearings. So long as the oil film is maintained between the bearing and the journal, the space between the pocket and the end of the bearing will be air sealed and the pump will continue to function and amply supply the bearing with lubricant, but if the seal becomes broken because of lack of oil or because of lateral oscillations of the journal within the bearing, the circulation of oil is discontinued.

To obviate this danger, I provide the bearing with an auxiliary oil circulating means for the purpose of maintaining a supply of oil on the bearing surface sufficient to renew the air seal in case it becomes broken and to maintain lubrication of the bearing until the vacuum pump again functions. This auxiliary oil circulating means includes a fibrous wick 17 having its upper and enlarged end 18 inserted within a pocket 19 in the upper bearing bushing 4. The enlarged portion of the wick prevents it from becoming detached from the upper bearing bushing. The pocket 19 extends longitudinally and entirely across the bearing and is filled with loose oil-absorbing material, which is adapted to be continuously supplied with oil from the wick 17, the lower end of which is suspended in the oil 15. This wick continuously supplies the entire face of the bearing with sufficient oil to maintain or renew the air seal between the journal and the bearing. As a further precaution against the bearing becoming temporarily dry through the failure of the vacuum lubricating pump, I provide the bearing with two longitudinal grooves or pockets 20 and 21, the former terminating short of the ends of the bearings, as indicated in dotted lines in Fig. 2, and the latter extending the entire length of the bearing and opening out of the ends thereof. These grooves or pockets are connected by an arcuate groove 22 extending over the top of the bearing from one groove to the other. Oil from the vacuum pump accumulates in the pocket 20 and is moved by friction and suction through the channel 22 to the pocket 21 from whence it is discharged at the ends of the bearings. The circulation of the oil is increased by means of the centrifugal action of the collars 11 and grooves 12, which tend to create a vacuum adjacent the ends of the bearings and thereby augment the vacuum created by the vacuum pump. The circulation of oil by the vacuum pump is thereby increased and the liability of failure of the vacuum pump correspondingly reduced.

Should a break occur in the air seal, the oil in the pockets 20 and 21, together with the oil delivered to the bearing by the wick 17, would immediately serve to renew the seal. The wick also maintains a supply of oil in the bearing to maintain the air seal between the journal and the bearing, when the shaft is idle, so that the vacuum pump will function immediately upon the rotation of the shaft.

It will be seen that the means for lubricating the bearing are actuated automatically and require a minimum of attention. The pocket for the upper end of the wick is placed in the upper bearing 4, where it is accessible for inspection upon the removal of the cap 7. The block 6 and the cap 7 are provided with suitable packing rings 23 for preventing the escape of oil from the bearing and for excluding foreign particles therefrom.

While I have shown my invention in but one form, it will be obvious to those skilled in the art that it is not so limited but is susceptible of various other changes and modifications without departing from the spirit thereof and I desire, therefore, that only such limitations shall be placed thereon as are imposed by the prior art or as are specifically set forth in the appended claims.

What I claim is:—

1. The combination with a journal, a bearing block having an oil receptacle in the lower portion thereof, and a bearing therefor having a lubricating means operating 1,416,884 by virtue of the vacuum produced by the rotation of the journal in the bearing for supplying oil from said receptacle to the bearing, of an auxiliary lubricating means independent of the first-named means for constantly supplying the space between the journal and the bearing with oil from the said receptacle.

2. The combination with a journal, a bearing block having an oil receptacle in the lower portion thereof, and a bearing therefor having a lubricating means operating by virtue of the vacuum produced by the rotation of the journal in the bearing for supplying oil from said receptacle to the bearing, of an auxiliary lubricating means comprising a wick adapted to supply lubricant continuously from the said receptacle to the space between the journal and the bearing.

3. The combination with a journal and a bearing therefor having a lubricating means operating by virtue of the vacuum produced by the rotation of the journal in the bearing, of means independent of the said means for maintaining an oil seal between the said means and the ends of the bearing.

4. The combination with a journal and a bearing and an oil supply therefor, of a conduit extending from the oil supply and opening into the bearing between the ends thereof and adapted to circulate oil by virtue of the vacuum produced by the rotation of the journal in the bearing, and an auxiliary oil circulating system adapted to maintain a film of oil between the journal and the bearing for air-sealing the space therebetween.

5. The combination with a journal and a bearing and an oil supply therefor beneath the bearing, of a conduit extending from the oil supply and opening into the bearing between the ends thereof and adapted to circulate oil by virtue of the vacuum produced by the rotation of the journal in the bearing, and an auxiliary oil circulating system comprising a wick contacting with the journal and extending into contact with the oil supply, whereby an oil film is maintained between the journal and the bearing.

6. The combination with a journal and a bearing and an oil supply therefor beneath the bearing, of a conduit extending from the oil supply and opening into the bearing between the ends thereof and adapted to circulate oil by virtue of the vacuum produced by rotation of the journal in the bearing, and an auxiliary oil circulating system comprising a wick terminating in a pocket in the upper side of the bearing and extending into the oil supply, whereby oil is circulated from the oil supply to the bearing for maintaining a film of oil between the journal and the bearing.

7. The combination of a journal and a bearing therefor having lubricating means operating by virtue of a vacuum produced by rotation of the journal in the bearing, means for creating a vacuum at the bearing ends and augmenting the vacuum of the lubricating means.

8. A lubricating journal box, comprising a bearing block having a receptacle for oil, a cap for the block, the block and cap having interior ribs, bushing members having flanges cooperating with said ribs, vacuum lubricating means for supplying oil from the said receptacle to the bearing surfaces, and other means to supply oil from said receptacle to the bearing to maintain the vacuum for the first means.

9. A journal and a bearing therefor, vacuum operated lubricating means for the bearing, and vacuum creating means at the ends of the bearing adapted to augment the vacuum of the first means, and other means for supplying lubricant to the bearing both for lubricating purposes and for the maintenance of the operation of the first means.

10. A journal and a bearing therefor, lubricating means operated by virtue of a vacuum produced by the rotation of the journal in the bearing, means for creating a vacuum at the ends of the bearing, and wick means for supplying oil to the bearing both for lubricating purposes and for the purpose of maintaining the operation of the first means.

11. A lubricating journal bearing including a plurality of bushing members, a block having a lubricant receptacle and a cap for the block for holding said bushing members, vacuum lubricating means carried by one of the bushing members and communicating with the receptacle, means for maintaining the air seal at the bushing ends comprising a pocket terminating short of the bushing ends, a second groove or pocket extending throughout the bushing length, a connecting arcuate passage-way for said pockets, and means communicating with said arcuate passage-way and with the bearing surface to supply said pocket, passage-way, and bearing surfaces with lubricant.

12. A lubricating journal bearing comprising bushing members and a journal, vacuum-operated lubricating means carried by one bushing member, wick lubricating means associated with the other bushing and adapted to supply lubricant to the bearing surfaces and prevent a break in air seal for said first means, and disk members secured to said shaft contiguous to the bushing ends and having radial grooves on the faces next to the bushing ends whereby a vacuous condition is created at the bushing ends thereby improving the operation of the first means.

13. The combination with a journal and a bearing therefor having a lubricating means operating by virtue of the vacuum produced by the rotation of the journal in the bearing, of auxiliary vacuum-creating means at the ends of the bearing adapted to augment the vacuum of the first means.

14. The combination with a journal, a bearing, and an oil supply therefor, of a conduit extending from the oil supply and opening into the bearing between the ends thereof and adapted to circulate oil by virtue of the vacuum produced by the rotation of the journal in the bearing, of an auxiliary vacuum-creating means at the ends of the bearing adapted to augment the vacuum of the first means.

In testimony whereof, I have hereunto subscribed my name this 17th day of February, 1920.

HENRY F. SCHMIDT.